United States Patent
Onoda et al.

(10) Patent No.: US 9,090,232 B2
(45) Date of Patent: Jul. 28, 2015

(54) VEHICLE BRAKING/DRIVING FORCE CONTROL DEVICE

(75) Inventors: Yuichi Onoda, Toyota (JP); Kei Takakuwa, Chiryu (JP); Hideki Fukudome, Toyota (JP); Satoshi Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/354,282

(22) PCT Filed: Nov. 8, 2011

(86) PCT No.: PCT/JP2011/075703
§ 371 (c)(1),
(2), (4) Date: Apr. 25, 2014

(87) PCT Pub. No.: WO2013/069092
PCT Pub. Date: May 16, 2013

(65) Prior Publication Data
US 2014/0343816 A1    Nov. 20, 2014

(51) Int. Cl.
| | |
|---|---|
| *G06G 7/66* | (2006.01) |
| *B60T 7/12* | (2006.01) |
| *B60L 7/18* | (2006.01) |
| *B60W 30/184* | (2012.01) |
| *B60L 7/26* | (2006.01) |
| *B60L 15/20* | (2006.01) |
| *B60T 8/1755* | (2006.01) |
| *B60K 7/00* | (2006.01) |
| *B60W 10/08* | (2006.01) |

(52) U.S. Cl.
CPC ... *B60T 7/12* (2013.01); *B60L 7/18* (2013.01); *B60L 7/26* (2013.01); *B60L 15/2009* (2013.01); *B60T 8/17552* (2013.01); *B60W 30/1843* (2013.01); *B60K 7/0007* (2013.01); *B60L 2220/44* (2013.01); *B60L 2240/425* (2013.01); *B60T 2240/06* (2013.01); *B60W 10/08* (2013.01); *Y02T 10/648* (2013.01); *Y02T 10/7275* (2013.01)

(58) Field of Classification Search
None
See application file for complete search history.

(56) References Cited

FOREIGN PATENT DOCUMENTS

| | | |
|---|---|---|
| JP | A-2005-341701 | 12/2005 |
| JP | A-2007-124832 | 5/2007 |
| JP | A-2009-247205 | 10/2009 |

*Primary Examiner* — Thomas Tarcza
*Assistant Examiner* — Garrett Evans
(74) *Attorney, Agent, or Firm* — Oliff PLC

(57) ABSTRACT

An ECU calculates the thermal margins of the in-wheel motors, on the basis of the thermal capacities of the in-wheel motors, the allowable limit temperatures, and the motor temperatures. Next, the ECU distributes the total requested torque between the requested torques for each wheel using the percentages of the thermal margins. The ECU controls the operation of an inverter such that the in-wheel motors generate the requested torques for the wheels. Thus, the four in-wheel motors generate uniform amounts of heat.

11 Claims, 11 Drawing Sheets

VEHICLE BRAKING/DRIVING FORCE CONTROL DEVICE

TECHNICAL FIELD

The present invention relates to a vehicle braking/driving force control device for controlling a driving force or a braking force to produce with each wheel of the vehicle individually.

BACKGROUND ART

As one form of electric cars, an in-wheel motor type vehicle in which a motor is arranged in or around the wheel placed under the vehicle body spring and drives the wheel directly is developed. In the in-wheel motor type vehicle, it is possible to control the driving force or the braking force given to each wheel independently depending on the traveling condition of the vehicle by an independent drive (power running) control or an independently regenerative control of a motor provided to every wheel.

Because a motor is arranged in or around the wheel in such an in-wheel motor type vehicle, generated heat by the braking/driving movement of the motor is hard to be emitted and the motor is easy to be full of heat. Thus, for example, in the driving force control device proposed to Patent Literature 1, when the temperature of the motor was detected and it was estimated that the motor temperature would exceed a permission limit temperature based on the increasing ratio of the detected temperature, the ghosting of the motor is prevented by correcting the driving force of the wheel corresponding to the motor in which it was estimated that the motor temperature would exceed the permission limit temperature so as to decrease the driving force. Further, when the wheel corresponding to a motor in which it was estimated that the motor temperature would exceed the permission limit temperature is the one side of the front wheel, is prevented by correcting the change of the behavior of the yaw rate by correcting the driving force of the wheel of the same side in the rear wheel so as to increase the driving force.

CITATION LIST

Patent Literature

[PTL 1] JP Laid-Open Patent NO. 2009-247205

SUMMARY OF INVENTION

However, in the driving force control device proposed to Patent Literature 1, the distribution change of the braking/driving force responded to the heat generation state of the motor is not performed at all in the period when it is not estimated that motor temperature will exceed the permission limit temperature, and the braking/driving force of the motor is limited at the point in time when it is estimated that the motor temperature will exceed the permission limit temperature. Therefore, during the period until the point in time, a big difference occurs in the use situation of each motor, and the heat generation state of each motor becomes imbalance, and a motor with enough thermal margins is mixed with a motor with a little thermal margins. Thus, because thermal margins of each motor may become imbalance, only one motor may reach the permission limit temperature at an early stage. In this case, because the braking/driving force of the motor will be limited from the point in time, the control property of the yaw rate or the lateral acceleration that can occur in the vehicle may decrease.

The present invention has been made to solve the above-mentioned problems, and is intended that each motor becomes hard to reach the permission limit temperature by averaging thermal margins of each motor.

According to the characteristic of the invention to solve the problems, a vehicle braking/driving force control device comprises an in-wheel motor (20_1-20_4) provided with each of wheels of a vehicle and generates a driving force or a braking force for the wheel, and a motor control means (40) to control each in-wheel motor and to produce the driving force or the braking force in each wheel independently, and the motor control means comprises a thermal margin calculation means (S12) to calculate the size of a thermal margin (Mg_1-Mg_4) of the each in-wheel motor, and a braking/driving force distribution calculation means (S13, S131, S37, S46) to calculate the distribution of the driving force or the braking force of the wheel to produce in the each in-wheel motor so as to average the thermal margin of the each in-wheel motor based on the balance of the thermal margin of the each in-wheel motor calculated by the thermal margin calculation means.

In this case, it is preferable that the thermal margin calculation means comprises a temperature acquisition means (50_1-50_4, S11) to acquire the temperature of the each in-wheel motor, and calculates the size of the thermal margin (Mg_1-Mg_4) of the each in-wheel motor based on the acquired temperature (Tmp_1-Tmp_4) of the each in-wheel motor by the temperature acquisition means and the thermal capacity (C_1-C_4) of the each in-wheel motor.

Further, it is preferable that the thermal margin calculation means calculates the size of the thermal margin based on the product of the thermal capacity of the in-wheel motor and a value obtained by reducing the acquired temperature by the temperature acquisition means from the allowable limit temperature (Tmp_max_1-Tmp_max_4) of the in-wheel motor.

According to the invention, the motor control means control each in-wheel motor and produces the driving force or the braking force in each wheel independently. The motor control means comprises the thermal margin calculation means and the braking/driving force distribution calculation means. The thermal margin calculation means calculates the size of the thermal margin of the each in-wheel motor. It is possible to calculate the size of the thermal margin based on the temperature of the each in-wheel motor and the thermal capacity of the each in-wheel motor. For the purpose the thermal margin calculation means comprises the temperature acquisition means to acquire the temperature of the each in-wheel motor. Here, the wording of "to acquire the temperature" means acquiring information representing the temperature, and for example, information representing the temperature detected by the temperature sensor directly may be acquired, or information representing the estimate temperature calculated based on the current flowing in the in-wheel motor may be acquired.

In this case, it is preferable that the size of the thermal margin, for example, is calculated based on the product of the thermal capacity of the in-wheel motor and the value obtained by reducing the acquired temperature by the temperature acquisition means from the allowable limit temperature of the in-wheel motor.

When an imbalance occurs in the thermal margin of the each in-wheel motor, only a particular in-wheel motor may reach the allowable limit temperature at an early stage, and, in that case, from the point in time, the braking/driving force of the motor will be limited, and the travel performance of the vehicle decreases. Thus, in the present invention, the braking/driving force distribution calculation means calculates the distribution of the driving force or the braking force of the wheel to produce in the each in-wheel motor so as to average (equalize) the thermal margin of the each in-wheel motor based on the balance of the thermal margin of the each in-wheel motor. For example, the distribution of the driving force or the braking force of the wheel is calculated so that the distribution becomes big as the in-wheel motor that size of the thermal margin is big, and the distribution becomes small as the in-wheel motor that size of the thermal margin is small.

According to the invention, the temperature of the each in-wheel motor can be averaged, and it is prevented that only a particular in-wheel motor reaches the allowable limit temperature at an early stage. Therefore, all in-wheel motors become hard to reach the allowable limit temperature and can make the performance shown enough and can prevent the deterioration of the travel performance of the vehicle According to another characteristic of the invention, the braking/driving force distribution calculation means performs (S13) the calculation so that a total requested braking/driving force as a requested value of the driving force or the braking force to produce in the in-wheel motors of all wheels is distributed into the in-wheel motor of each wheel with the balance of the thermal margin of the in-wheel motor of each wheel.

In the present invention, the total requested braking/driving force is distributed into the in-wheel motor of each wheel with the balance of the thermal margin of the in-wheel motor of each wheel. That is, the distribution of the driving force or the braking force of the wheel is calculated so that the distribution becomes big as the in-wheel motor that size of the thermal margin is big and adversely the distribution becomes small as the in-wheel motor that size of the thermal margin is small. Therefore, according to the present invention, the temperature of the each in-wheel motor can be averaged well.

According to another characteristic of the invention, the braking/driving force distribution calculation means performs (S131) the calculation so that the left wheel requested braking/driving force as a requested value of the driving force or the braking force to produce in the in-wheel motors of the left side front and rear wheels is distributed between in-wheel motors of the left side front and rear wheels with the balance of the thermal margin of the in-wheel motor of the left side front wheel and the thermal margin of the in-wheel motor of the left side rear wheel, and the right wheel requested braking/driving force as a requested value of the driving force or the braking force to produce in the in-wheel motors of the right side front and rear wheels is distributed between in-wheel motors of the right side front and rear wheels with the balance of the thermal margin of the in-wheel motor of the right side front wheel and the thermal margin of the in-wheel motor of the right side rear wheel.

In the present invention, the requested braking/driving force is distributed with the balance of the thermal margin of the in-wheel motor between the front wheel and the rear wheel concerning in-wheel motors of the left side front/rear wheels and in-wheel motors of the right side front/rear wheels, respectively. That is, the distribution of driving force or the braking force based on the thermal margin is performed between the front wheel and the rear wheel without being performed between the left wheel and the right wheel. Therefore, it is possible to prevent the behavior change of the yaw direction of the vehicle while averaging the temperature of in-wheel motors of front/rear wheels.

According to another characteristic of the invention, the braking/driving force distribution calculation means comprises a traveling condition acquisition means (S21, S41, S42) to acquire the traveling condition of the vehicle, and a distribution adjustment means (S22-S23, S31-S36, S43-S45) to adjust the distribution based on the heat dissipation performance of the each in-wheel motor responded to the acquired traveling condition by the traveling condition acquisition means.

In this case, it is preferable that the distribution adjustment means performs the adjustment so that the distribution of the driving force or the braking force becomes small to the in-wheel motor which is hard to dissipate heat based on the heat dissipation performance of the each in-wheel motor responded to the acquired traveling condition by the traveling condition acquisition means.

The heat generation state of the in-wheel motor changes depending on the heat dissipation performance thereof. Also, the heat dissipation performance changes depending on the traveling condition of the vehicle. Thus, in the present invention, the traveling condition acquisition means acquires the traveling condition of the vehicle and the distribution adjustment means adjusts the driving force or the braking force based on the heat dissipation performance of the each in-wheel motor responded to the traveling condition. For example, based on the heat dissipation balance of the each in-wheel motor depending on the traveling condition, it is adjusted to lower the distribution of the driving force or the braking force to the in-wheel motor which is hard to dissipate heat. That is to say, it is adjusted to the in-wheel motor which is easy to dissipate heat so that the distribution of driving force or the braking force becomes big. Therefore, according to the present invention, the temperature of the each in-wheel motor can be averaged still better. Note that, the wording of "to acquire the traveling condition" means acquiring information representing the traveling condition.

According to another characteristic of the invention, the traveling condition acquisition means is a vehicle speed acquisition means (S21) to acquire the vehicle speed, and the distribution adjustment means adjusts (S22-S23) the distribution so that when the acquire vehicle speed is high by the vehicle speed acquisition means, the distribution ratio of the in-wheel motor of the rear wheel for the in-wheel motor of the front wheel becomes small in comparison with the case of low speed condition of the vehicle.

The in-wheel motor comes to have good cooling performance caused by the wind as the vehicle speed is high, but the wind is hard to hit the in-wheel motor of the rear wheel, and the in-wheel motor of the rear wheel is inferior to the in-wheel motor of the front wheel about the cooling performance. Therefore, at the high-speed traveling, a difference produces in cooling performance between the in-wheel motor of the front wheel and the in-wheel motor of the rear wheel in comparison with the low-speed traveling. Thus, in the present invention, the distribution adjustment means adjusts the distribution so that when the acquire vehicle speed is high, the distribution ratio of the in-wheel motor of the rear wheel for the in-wheel motor of the front wheel becomes small in comparison with the case of low speed condition of the vehicle. That is to say, the distribution is adjusted so that when the acquire vehicle speed is high, the distribution ratio of the in-wheel motor of the front wheel for the in-wheel motor of the rear wheel becomes big in comparison with the case of low speed condition of the vehicle. Therefore, according to the present invention, the temperature of the each in-wheel motor can be averaged still better. Note that, the wording of "to acquire vehicle speed" means acquiring information representing the vehicle speed.

According to another characteristic of the invention, the traveling condition acquisition means is a turning condition acquisition means (S41-S42) to acquire the turning condition of the vehicle, and the distribution adjustment means performs (S43-S45) the adjustment so that the distribution of the driving force or the braking force of the in-wheel motor which is hard to dissipate heat among in-wheel motors of the left side rear wheel and the right side rear wheel becomes small based on the acquired turning condition of the vehicle by the turning condition acquisition means.

When the vehicle turns, the cooling performance differs because the degree to which the wing is hitting between the in-wheel motor of the left side rear wheel and the in-wheel motor of the right side rear wheel. Thus, in the present invention, the distribution adjustment means performs the adjustment so that the distribution of the driving force or the braking force of the in-wheel motor which is hard to dissipate heat among in-wheel motors of the left side rear wheel and the right side rear wheel becomes small based on the turning condition of the vehicle. Therefore, according to the present invention, the temperature of the each in-wheel motor can be averaged still better. Note that, the wording of "to acquire the turning condition" means acquiring information representing the turning condition.

According to another characteristic of the invention, the turning condition acquisition means acquires the slip angle of the vehicle, and the distribution adjustment means performs the adjustment so that the distribution of the driving force or the braking force of the in-wheel motor which is hard to dissipate heat among in-wheel motors of the left side rear wheel and the right side rear wheel becomes small based on the acquired slip angle of the vehicle by the turning condition acquisition means.

In the in-wheel motors of the right side and left side rear wheels, the degree to which the wing is hitting changes depending on the slip angle, and the balance of the cooling performance changes. Thus, in the present invention, the distribution adjustment means performs the adjustment so that the distribution of the driving force or the braking force of the in-wheel motor which is hard to dissipate heat among in-wheel motors of the left side rear wheel and the right side rear wheel becomes small based on the slip angle of the vehicle. Therefore, according to the present invention, the temperature of the each in-wheel motor can be averaged still better. Note that, the wording of "to acquire the turning condition" means acquiring information representing the turning condition.

According to another characteristic of the invention, the traveling condition acquisition means is a vehicle speed acquisition means to acquire the vehicle speed, and the distribution adjustment means comprises a load balance acquisition means (S31-S33) to acquire the load balance representing the balance with the load to be added to the front wheel of the vehicle and the load to be added to the rear wheel of the vehicle, and adjusts the driving force or the braking force of the each in-wheel motor to a distribution depending on the acquired load balance by the load balance acquisition means, and lowers (S34-S36) the degree to adjust to the distribution depending on the load balance when the vehicle speed is low in comparison with the case of high speed condition of the vehicle.

The driving force or the braking force of the wheel or the braking force should be distributed depending on the load balance between the front wheel and the rear wheel to obtain the good stability of the vehicle. However, because the cooling performance of in-wheel motors of all wheels decreases at the low-speed traveling, a difference is easy to be produced in the thermal margin of the in-wheel motor by adjusting the depending on the load balance. Thus, in the present invention, the distribution adjustment means lowers the degree to adjust to the distribution depending on the load balance when the vehicle speed is low in comparison with the case of high speed condition of the vehicle. That is to say, the degree to adjust to the distribution depending on the thermal margin balance is big when the vehicle speed is low in comparison with the case of high speed condition of the vehicle. Therefore, according to the present invention, at the normal traveling, the good stability of the vehicle is provided and can average the temperature of the each in-wheel motor at the low-speed traveling. Note that, the wording of "to acquire the load balance" means acquiring information representing the load balance. The load balance may be acquired, for example, from the detection value of a load sensor provided to detect the load acting on each wheel, or it may be acquired from the calculation value with the detection value of a vehicle height sensor and a spring constant of the suspension, or it may the preset fixed value.

Note that, in the above-mentioned explanation, the constitution of the invention corresponding to the embodiment is described using a reference sign placed between brackets, but each constituent features of the invention is not limited to the embodiment prescribed using the reference sign.

DESCRIPTION OF EMBODIMENTS

Figure 1:
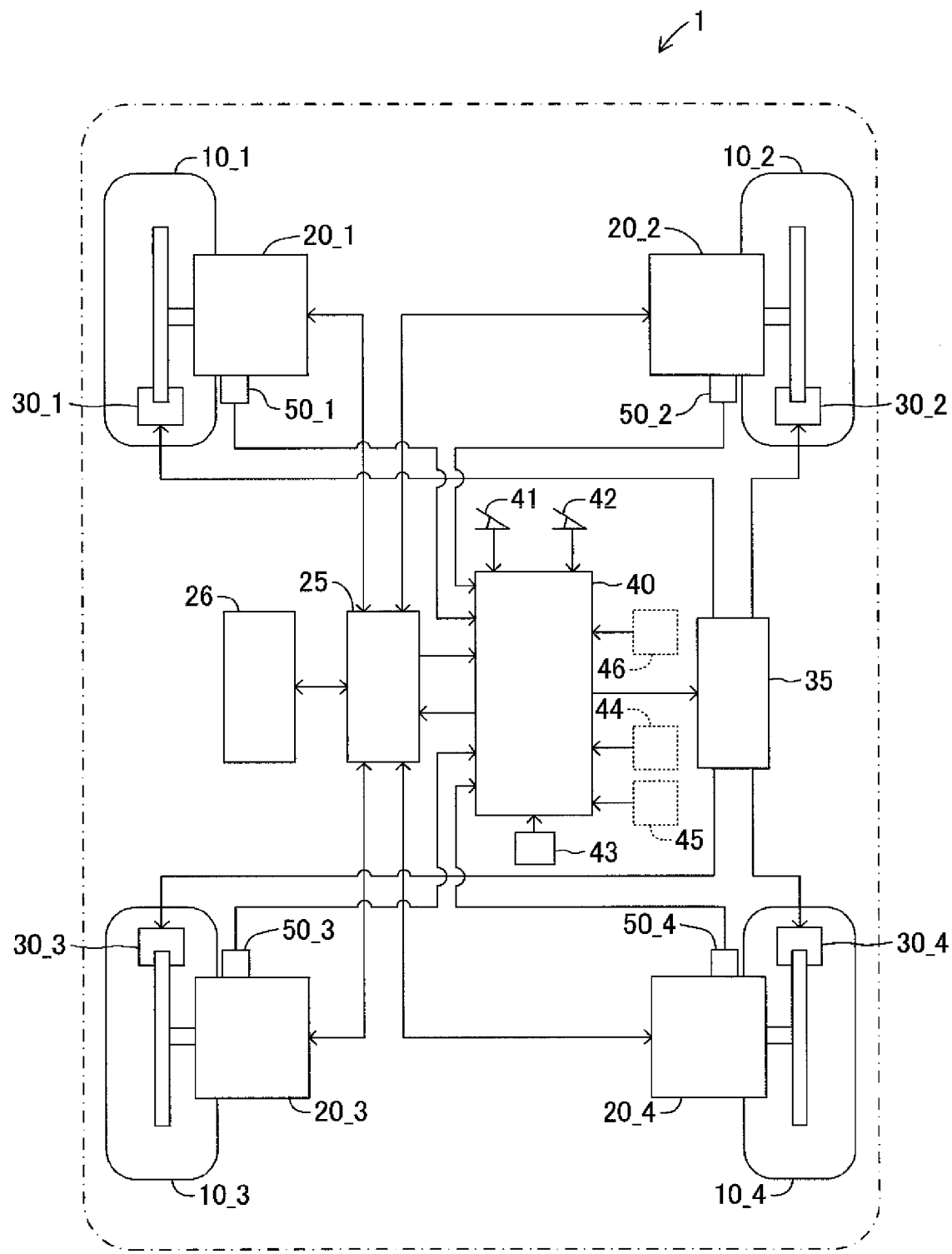
FIG. 1 is a figure of outline constitution of a vehicle equipped with a vehicle braking/driving force control device concerning an embodiment of the present invention.

Embodiments of the present invention are described below with reference to the drawings. FIG. 1 is a figure which shows the outline constitution of a vehicle 1 equipped with a vehicle braking/driving force control device concerning an embodiment of the present invention.

The vehicle 1 comprises left and right front wheels 10_1, 10_2 and left and right rear wheels 10_3, 10_4. In-wheel motors 20_1, 20_2 are incorporated inside left and right front wheels 10_1, 10_2, and in-wheel motors 20_3, 20_4 are also incorporated inside left and right rear wheels 10_3, 10_4. In-wheel motors 20_1, 20_2 and in-wheel motors 20_3, 20_4 are connected capable of power transmitting to left and right front wheels 10_1, 10_2 and left and right rear wheels 10_3, 10_4, respectively. In this vehicle 1, it is possible to control the driving force and the braking force occurred in left and right front wheels 10_1, 10_2 and left and right rear wheels 10_3, 10_4, independently, respectively by controlling a rotation of each in-wheel motor 20_1-20_4 independently, respectively.

Each in-wheel motor 20_1-20_4 is connected to an inverter 25 which is a motor driver. It is provided with four sets of inverter 25 in response to each in-wheel motor 20_1-20_4, and each inverter 25 converts the DC power supplied from a battery 26 into the AC power and supplies the AC power to each in-wheel motor 20_1-20_4 independently. Thereby, each in-wheel motor 20_1-20_4 is controlled and gives the driving force to left and right front wheels 10_1, 10_2 and left and right rear wheels 10_3, 10_4.

Further, each in-wheel motor 20_1-20_4 functions as a generator, and generates electricity by rotary energy of left and right front wheels 10_1, 10_2 and left and right rear wheels 10_3, 10_4, and regeneration of generated power to the battery 26 via the inverter 25 is enabled. The braking force to occur by generation of this in-wheel motor 20_1-20_4 gives a braking force to wheels.

Further, each wheel 10_1-10_4 is provided with brake mechanisms 30_1, 30_2, 30_3, 30_4, respectively. For example, each brake mechanism 30_1-30_4 is well-known braking devise such as a disc brake or a drum brake. These brake mechanisms 30_1-30_4 are connected to a brake actuator 35 and a piston or a brake shoe (not shown in figure) of the brake caliper operate by oil pressure supplied from the brake actuator 35 and cause the braking force in each wheel 10_1-10_4.

The inverter 25 and the brake actuator 35 are connected to an electronic control unit 40, respectively. The electronic control unit 40 (referred to as an ECU 40) assume microcomputer comprising a CPU, a ROM, a RAM a main component and executes various programs and controls the operation of each in-wheel motor 20_1-20_4. Therefore, the ECU 40 is connected to an accelerator sensor 41 which detects the accelerator operation quantity by the driver based on the stepping amount (or the angle or the pressure and so forth) of the accelerator pedal, and to a brake sensor 42 which detects the brake operation quantity by the driver based on the stepping amount (or the angle or the pressure and so forth) of the brake pedal, and to a vehicle speed sensor 43 which detects the vehicle speed V of the vehicle 1, and the sensor signal representing accelerator operation quantity, the brake operation quantity, vehicle speed is input into the ECU. Further, the sensor signals which is necessary for the motor control like as the signal representing the current value to flow to each in-wheel motor 20_1-20_4 from the inverter 25, or the signal representing the supply voltage supplied to the inverter 25 and so forth are input into the ECU 40 from the inverter 25.

Each in-wheel motor 20_1-20_4 is provided with temperature sensors 50_1, 50_2, 50_3, 50_4 for detecting the motor temperature, respectively. The sensor signal representing the motor temperature Tmp_1, Tmp_2, Tmp_3, Tmp_4 detected by each temperature sensor 50_1, 50_2, 50_3, 50_4 is input into the ECU 40. Each temperature sensor 50_1-50_4 should detect the temperature of the part that can detect the heat generation state of in-wheel motors 20_1-20_4 and, for example, detects the temperature in the motor casing or the temperature of the coil and so forth. Note that, replacing with constitution to detect the motor temperature directly by temperature sensors 50_1-50_4, constitution to estimate the motor temperature based on the current value to supply to in-wheel motors 20_1-20_4 can be adopted. Because it is well-known, the estimate of the motor temperature is not described here, but, for example, it is possible to measure the current value to supply to the motor and estimate the motor temperature by the calculation using the square multiplication value of the measured current value.

As follows, about each wheel 10_1-10_4, when one or more of such wheels should be not identified, it is merely referred to as a wheel 10. Also, about each in-wheel motor 20_1-20_4, when one or more of such in-wheel motors should be not identified, it is merely referred to as an in-wheel motor 20. Also, about each brake mechanism 30_1-30_4, when one or more of such brake mechanisms should be not identified, it is merely referred to as a brake mechanism 30. Also, about each temperature sensor 50_1-50_4, when one or more of such temperature sensors should be not identified, it is merely referred to as a temperature sensor 50.

The ECU 40 calculates the requested driving force and the requested braking force (the target driving force and the target braking force) depending on the accelerator operation quantity and the brake operation quantity by the driver, namely, the total requested braking/driving force to make the vehicle 1 travel or braked based on the signal input from the accelerator sensor 41 and the brake sensor 42. In this embodiment, by a method to be described below, the total requested braking/driving force is divided into the requested braking/driving force for each wheel generated at in-wheel motor 20_1-20_4 of each wheel 10_1-10_4. It is in condition that the driving force is required when the value of the requested braking/driving force is plus number (positive number), and it in condition that the braking force is required the value of the requested braking/driving force is minus number (negative number).

The ECU 40 generates the PWM control signal so that the electric current depending on the requested braking/driving force for each wheel is supplied to the in-wheel motor 20, and outputs such control signal to the inverter 25. When the requested braking/driving force for each wheel is minus number (negative number), the in-wheel motor 20 is operated as a generator and generates regenerative braking torque. In this case, when the requested braking/driving force (braking force) for each wheel is bigger than the regenerative braking torque which can generate with the in-wheel motor 20, the requested braking/driving force for each wheel is set for the greatest regenerative braking torque which can occur with the in-wheel motor 20, and about the shortage by the regenerative braking torque, the control signal is output to the brake actuator 35 and the brake mechanism 30 is operated and generares the oil pressure braking torque.

In this way, the ECU 40 calculates the total requested braking/driving force which is the braking/driving force required to the vehicle 1 based on the signal input from the accelerator sensor 41 and the brake sensor 42, and controls the traveling state of vehicle 1 by outputting a signal which controls the driving/regenerative state of each in-wheel motor 20 and the operation of the brake actuator 35, namely, each brake mechanism 30, respectively, so as to generate such total requested braking/driving force.

Figure 2:
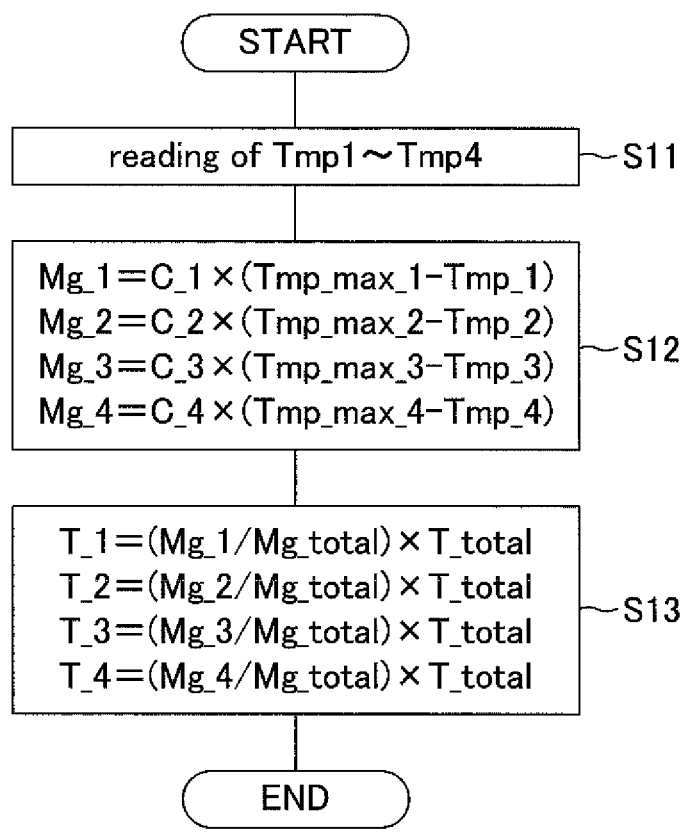
FIG. 2 is a braking/driving force distribution control routine concerning first embodiment.

A method to divide the total requested braking/driving force into the requested braking/driving force for each wheel is described. FIG. 2 represents the braking/driving force distribution control routine performed by the ECU 40. The braking/driving force distribution control routine is performed repeatedly in a scheduled short period in the period when an ignition switch is turned on. Note that, about the braking/driving force distribution control routine, an embodiment here is referred to as a first embodiment because of describing a plurality of embodiments as follows.

When the braking/driving force distribution control routine of the first embodiment starts, in step S11, the ECU 40 reads motor temperatures Tmp_1, Tmp_2, Tmp_3, Tmp_4 detected by temperature sensors 50_1-50_4 provided with each in-wheel motor 20_1-20_4. Then subsequently, in step S12, thermal margins Mg_1, Mg_2, Mg_3, Mg_4 in-wheel motors 20_1-20_4 are calculated. In this embodiment, thermal margins Mg_1-Mg_4 are calculated by using formulas (1)-(4) below.

$$Mg\_1 = C\_1 \times (Tmp\_max\_1 - Tmp\_1) \quad \text{formula (1)}$$

$$Mg\_2 = C\_2 \times (Tmp\_max\_2 - Tmp\_2) \quad \text{formula (2)}$$

$$Mg\_3 = C\_3 \times (Tmp\_max\_3 - Tmp\_3) \quad \text{formula (3)}$$

$$Mg\_4 = C\_4 \times (Tmp\_max\_4 - Tmp\_4) \quad \text{formula (4)}$$

Here, C_1, C_2, C_3, C_4 are predetermined thermal capacities of in-wheel motors 20_1, 20_2, 20_3, 20_4, and Tmp_max_1, Tmp_max_2, Tmp_max_3, Tmp_max_4 are predetermined allowable limit temperatures of in-wheel motors 20_1, 20_2, 20_3, 20_4. As follows, when thermal margins Mg_1-Mg_4, thermal capacities C_1-C_4, allowable limit temperatures Tmp_max_1-Tmp_max_4, motor temperatures Tmp_1-Tmp_4 are named generally, it is referred to as a thermal margin Mg_k, a thermal capacity C_k, an allowable limit temperature Tmp_max_k, a motor temperature Tmp_k.

Then subsequently, in step S13, the ECU 40 calculates requested torques (each wheel requested torque) T_1, T_2, T_3, T_4 of in-wheel motors 20_1, 20_2, 20_3 using formulas (5)-(8) below.

$$T\_1 = (Mg\_1/Mg\_total) \times T\_total \quad \text{formula (5)}$$

$$T\_2 = (Mg\_2/Mg\_total) \times T\_total \quad \text{formula (6)}$$

$$T\_3 = (Mg\_3/Mg\_total) \times T\_total \quad \text{formula (7)}$$

$$T\_4 = (Mg\_4/Mg\_total) \times T\_total \quad \text{formula (8)}$$

Here, Mg_total is a total value(=Mg_1+Mg_2+Mg_3+Mg_4) of thermal margins Mg_1-Mg_4 of in-wheel motors 20_1-20_4. Also, T_total is a torque to represent the total requested braking/driving force. As follows, when the requested torque T_1-T_4 for each wheel is named generally, it is referred to as a requested torque T_k for each wheel.

As It is understood from above formulas (5)-(8), in step S13, the ECU 40 distributes the total requested torque T_total between requested torques T_1-T_4 for each wheel by using the ratio (balance) of thermal margins Mg_1-Mg_4 of in-wheel motors 20_1-20_4.

The ECU 40 terminates the braking/driving force distribution control routine after having calculated requested torques T_1-T_4 for each wheel in step S13. And, similar processing is repeated in a scheduled period. The ECU 40 controls the operation of the inverter 25 based on requested torques T_1-T_4 for each wheel calculated by this braking/driving force distribution control routine so that each in-wheel motor 20_1-20_4 generates requested torques T_1-T_4 for each wheel.

According to the braking/driving force distribution control routine of this first embodiment, the requested torque T_k for each wheel is set based on balance of the size of thermal margins Mg_k of four in-wheel motors 20 so that the bigger the thermal margin Mg_k of the in-wheel motor 20 is, the bigger the requested torque T_k for each wheel of such in-wheel motor is. Therefore, the bigger the thermal margin Mg_k of the in-wheel motor 20 is, the bigger the requested torque T_k for each wheel of such in-wheel motor is, and the calorific value increases, and on the contrary, the smaller the thermal margin Mg_k of the in-wheel motor 20 is, the smaller the requested torque T_k for each wheel of such in-wheel motor is, and the calorific value decreases. Therefore, each thermal margin of four in-wheel motors 20 is averaged (equalized). Thereby, four in-wheel motors 20 generate uniform amounts of heat.

Thus, according to the present embodiment, the braking/driving force is not limited only after the motor temperature nears the allowable limit temperature like as the case of the conventional device, but each in-wheel motor 20 is controlled so that each thermal margin of four in-wheel motors 20 becomes equal from the normal condition in which the motor temperature is within the appropriate range. Therefore, it is prevented that only one in-wheel motor 20 reaches the overheat state at an early stage because it is not in a condition that the in-wheel motor 20 that the thermal margin is a little being mixed with the in wheel motor 20 that the thermal margin is enough. Therefore, all of in-wheel motors 20 may become hard to reach the allowable limit temperature, and it is possible to make use of ability of four in-wheel motors 20 enough. Therefore, it can be restrained that the movement performance (movement performance at the time of the, e.g., urgent evasion) of the vehicle decreases by the limit of the braking/driving force by the motor overheat. Also, the flexibility of the braking/driving force control of each wheel 10 can be maintained.

Then the variation of the braking/driving force distribution control routine of the first embodiment is described. In the first embodiment mentioned above, the total requested torque T_total is distributed into the requested torque T_k for each wheel of four in-wheel motors 20, but, in this variation, the total requested torque T_total is distributed between the left wheel requested torque T_left and the right wheel requested torque T_right, and such left wheel requested torque T_left and right wheel requested torque T_right are distributed between front wheels and rear wheels by using thermal margin, respectively.

For example, the left wheel requested torque T_left and the right wheel requested torque T_right may set in half of the total requested torque T_total, respectively. Alternatively, it is possible to provide a steering angle sensor 44 to show in FIG. 1 in broken line, and to set a right and left wheel distribution ratio Rrl (0<Rrl<1) depending on the steering angle θ detected by steering angle sensor 44 and the vehicle speed V detected by the vehicle speed sensor 43, and to define the left wheel requested torque T_left as the value that multiplied Rrl by the total requested torque T_total and the right wheel requested torque T_right as the value that multiplied (1−Rrl) by the total requested torque T_total.

Figure 3:
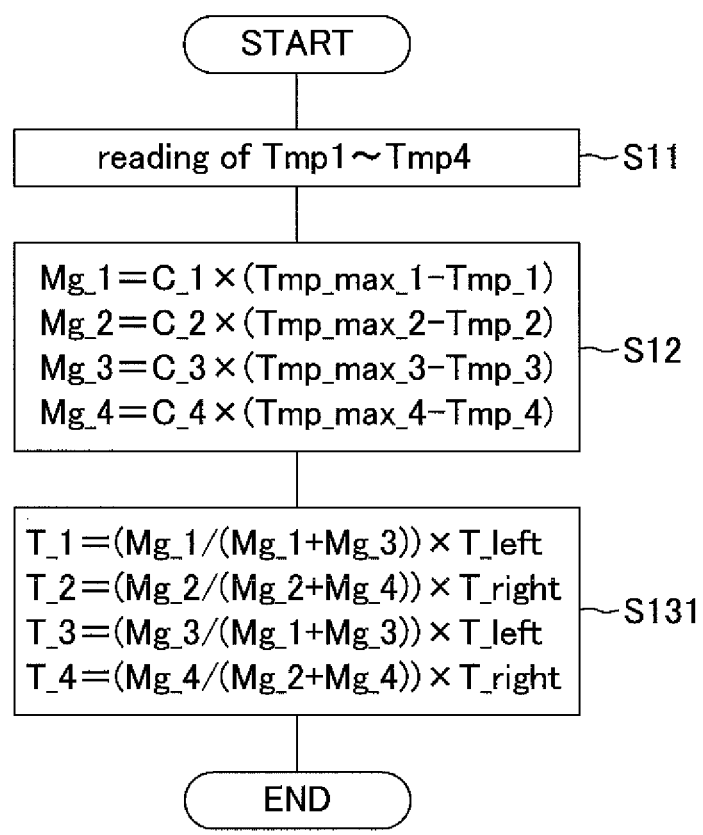
FIG. 3 is a braking/driving force distribution control routine concerning a variation of first embodiment.

FIG. 3 represents a braking/driving force distribution control routine performed by the ECU 40 as the variation of the first embodiment. In this the braking/driving force distribution control routine, the processing of step S13 of the first embodiment have been changed to step S131, and other processing (S11, S12) is the same in the case of the first embodiment.

The ECU 40 reads motor temperatures Tmp_k (k=1-4) in step S11 and, in step S12, calculates thermal margins Mg_k (k=1-4) of each in-wheel motor by using formulas (1)-(4) mentioned above. Then subsequently, in step S131, the ECU 40 calculates requested torques (the requested torque for each wheel) T_1-T_4 of each in-wheel motor 20_1-20_4 by using formulas (9)-(12) below.

$$T\_1=(Mg\_1/(Mg\_1+Mg\_3))\times T\_left \quad \text{formula (9)}$$

$$T\_2=(Mg\_2/(Mg\_2+Mg\_4))\times T\_right \quad \text{formula (10)}$$

$$T\_3=(Mg\_3/(Mg\_1+Mg\_3))\times T\_left \quad \text{formula (11)}$$

$$T\_4=(Mg\_4/(Mg\_2+Mg\_4))\times T\_right \quad \text{formula (12)}$$

The ECU 40 terminates the braking/driving force distribution control routine after having calculated requested torques T_1-T_4 for each wheel in step S131. And, similar processing is repeated in a scheduled period. The ECU 40 controls the operation of the inverter 25 based on requested torques T_1-T_4 for each wheel calculated by this braking/driving force distribution control routine so that each in-wheel motor 20_1-20_4 generates requested torques T_1-T_4 for each wheel.

According to the braking/driving force distribution control routine as a variation of this first embodiment, the change in behavior of the yaw direction of the vehicle 1 can be suppressed, because the left wheel requested torque T_left and the right wheel requested torque T_right are distributed between front wheels and rear wheels by using thermal margin, respectively. Further, because each thermal margin of four in-wheel motors 20 is averaged like as the case of the first embodiment, it is prevented that particular in-wheel motor 20 becomes overheat state at an early stage.

Then, a vehicle braking/driving force control device concerning a second embodiment is described. In the first embodiment mentioned above, the distribution of requested torque for each wheel was calculated only based on the thermal margin, but in this second embodiment, the distribution of requested torque for each wheel should be performed by adding the traveling state of vehicle 1.

At high-speed traveling of the vehicle 1, the cooling performance of in-wheel motors 20 caused by the wind improves, but in-wheel motors 20_3, 20_4 of rear wheels 10_3, 10_4 are inferior to in-wheel motors 20_1, 20_2 of front wheels 10_1, 10_2 in cooling performance because of being hard to come in contact with the wind. Thus, in the second embodiment, the distribution of requested torque for each wheel is set to mainly use in-wheel motors 20_1, 20_2 of front wheels 10_1, 10_2 being easy to cool down at high-speed traveling of the vehicle 1, and the overheat of in-wheel motors 20_3, 20_4 of wheels 10_3, 10_4 is prevented.

Figure 4:
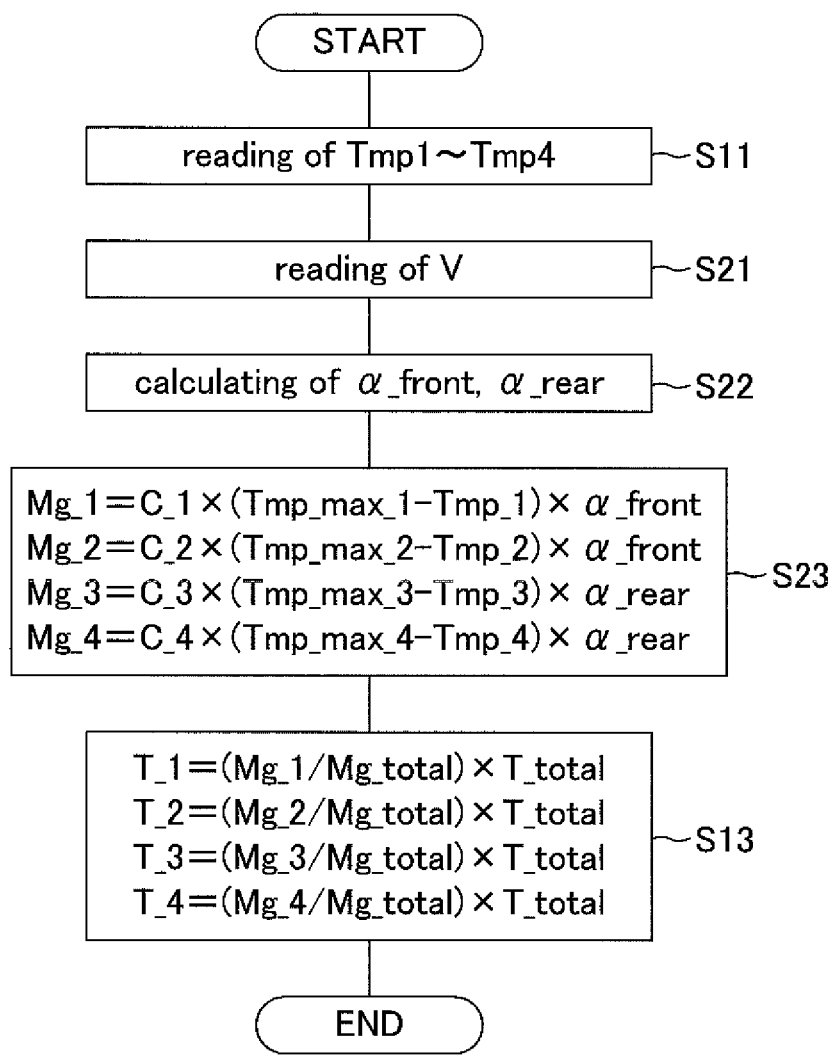
FIG. 4 is a braking/driving force distribution control routine concerning second embodiment.

FIG. 4 represents a braking/driving force distribution control routine performed by the ECU 40 as the second embodiment. In this the braking/driving force distribution control routine, the processing of step S12 of the first embodiment have been changed to steps S21, S22, S23, and other processing (S11, S13) is the same in the case of the first embodiment.

Figure 5:
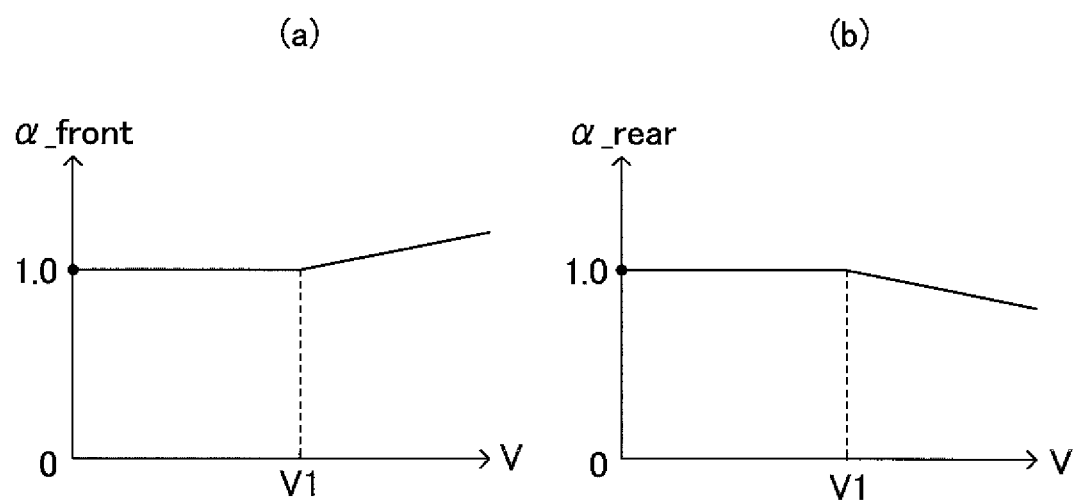
FIG. 5 is a graph representing a correction coefficient map concerning second embodiment.

When the braking/driving force distribution control routine starts, the ECU 40 reads motor temperatures Tmp_k (k=1-4) in step S11, and in step S21 subsequently reads the vehicle speed V detected by the vehicle speed sensor 43. Then subsequently, the ECU 40 calculates correction factors $\alpha\_front$, $\alpha\_rear$ depending on the vehicle speed V in step S22. The correction factor $\alpha\_front$ is calculated with reference to a correction factor map shown in FIG. 5 (*a*), and the correction factor $\alpha\_rear$ is calculated with reference to a correction factor map shown in FIG. 5 (*b*). Correction factor maps are memorized in memory of the ECU 40.

The correction factor $\alpha\_front$ is set in a value bigger than 1.0 at a high-speed traveling in which the speed V is more than a preset reference vehicle speed V1, and is set to 1.0 in cases where the speed is less than the reference vehicle speed V1. In this embodiment, the correction factor map has the characteristic that the higher the vehicle speed V is, the bigger the correction factor $\alpha\_front$ is, in cases where the speed V is more than the reference vehicle speed V1, but it may be a characteristic to set to a constant value bigger than 1.0. Also, the correction factor $\alpha\_rear$ is in a value (0<$\alpha\_rear$<1.0) smaller than 1.0 at a high-speed traveling in which the speed V is more than the reference vehicle speed V1, and is set to 1.0 in cases where the speed is less than the reference vehicle speed V1. In this embodiment, the correction factor map has the characteristic that the higher the vehicle speed V is, the smaller the correction factor $\alpha\_rear$ is, in cases where the speed V is more than the reference vehicle speed V1, but it may be a characteristic to set to a constant value smaller than 1.0.

Then subsequently, in step S23, the ECU 40 calculates thermal margins Mg_1-Mg_4 of in-wheel motors 20_1-20_4 by using formulas (13)-(16) below.

$$Mg\_1=C\_1\times(Tmp\_max\_1-Tmp\_1)\times\alpha\_front \quad \text{formula (13)}$$

$$Mg\_2=C\_2\times(Tmp\_max\_2-Tmp\_2)\times\alpha\_front \quad \text{formula (14)}$$

$$Mg\_3=C\_3\times(Tmp\_max\_3-Tmp\_3)\times\alpha\_rear \quad \text{formula (15)}$$

$$Mg\_4=C\_4\times(Tmp\_max\_4-Tmp\_4)\times\alpha\_rear \quad \text{formula (16)}$$

That is, the processing of this step S23 corrects the thermal margin Mg_k by multiplying correction factors $\alpha\_front$, $\alpha\_rear$ to the thermal margin Mg_k calculated in the first embodiment.

Then subsequently, the ECU 40 calculates requested torques T_1-T_4 for each wheel by using thermal margins Mg_1-Mg_4 and formulas (5)-(8) like as the case of the first embodiment.

The ECU 40 terminates the braking/driving force distribution control routine after having calculated requested torques T_1-T_4 for each wheel in step S13. And, similar processing is repeated in a scheduled period. The ECU 40 controls the operation of the inverter 25 based on requested torques T_1-T_4 for each wheel calculated by this braking/driving force distribution control routine so that each in-wheel motor 20_1-20_4 generates requested torques T_1-T_4 for each wheel.

According to the braking/driving force distribution control routine as this second embodiment, in cases where the speed V is more than the reference vehicle speed V1 based on the vehicle speed V representing the traveling condition of the vehicle 1, it is revised so that thermal margins of in-wheel motors 20_1, 20_2 of front wheels 10_1, 10_2 should increase, and thermal margins of in-wheel motors 20_3, 20_4 of front wheels 10_3, 10_4 should decrease. Thereby, when the vehicle speed is high, it is adjusted so that the distribution ratio of the braking/driving force of in-wheel motors 20_3, 20_4 of rear wheels 10_3, 10_4 for in-wheel motors 20_1, 20_2 of front wheels 10_1, 10_2 become small than a case having low vehicle speed.

At high-speed traveling, the cooling performance of in-wheel motors 20 caused by the wind improves, but in-wheel motors 20_3, 20_4 of rear wheels 10_3, 10_4 are inferior to in-wheel motors 20_1, 20_2 of front wheels 10_1, 10_2 in cooling performance because of being hard to come in contact with the wind. Thereby, imbalance of the cooling performance occurs. Thus, in the second embodiment, when the vehicle 1 travels at a vehicle speed which is more than the reference vehicle speed V1, thermal margins of in-wheel motors 20_1, 20_2 of front wheels 10_1, 10_2 and thermal margins of in-wheel motors 20_3, 20_4 of rear wheels 10_3, 10_4 are revised in consideration of the imbalance of the cooling performance. Thereby, at high-speed traveling, the braking/driving force distribution to in-wheel motors 20_3, 20_4 of rear wheels 10_3, 10_4 having low cooling performance should decrease, and the braking/driving force distribution to in-wheel motors 20_1, 20_2 of front wheels 10_1, 10_2 having high cooling performance should increase. As a result, each in-wheel motor 20 generates uniform amounts of heat, it is possible to prevent that in-wheel motors 20_3, 20_4 of rear wheels 10_3, 10_4 becomes the overheat state.

Note that, the processing of steps S21, S22, S23 may be combined with the variation of the first embodiment. That is, the calculation in step S131 may be performed by using the thermal margin Mg_k calculated in step S23.

Also, both of the correction factor α_front and the correction factor α_rear can be changed in the second embodiment, but either one of such factors may be set as above, and the other of such factors may be fixed to 1.0.

Then, a third embodiment is described. When the braking/driving force of each wheel 10 distributes according to the load ratio of each wheel 10, the vehicle stability becomes good. Thus, in the third embodiment, improvement of the vehicle stability is planned by distributing the braking/driving force into each wheel 10 while adding the load ratio as well as the thermal margin. In this case, when the vehicle travels at a low speed, because cooling performance of the in-wheel motor 20 of each wheel 10 caused by the wind decreases, the degree (weighting) to add the load ratio is changed depending on the vehicle speed, and the braking/driving force is distributed based on the balance of the thermal margin at the low vehicle speed.

In the third embodiment, the vehicle 1 is provided with an acceleration sensor 45 to detect the load movement of the vehicle 1 in FIG. 1 as shown in broken line. The acceleration sensor 45 detects the acceleration G in the longitudinal direction of the vehicle 1 and outputs a sensor signal representing detected acceleration G in the ECU 40. The acceleration sensor 45 detects the acceleration in the longitudinal direction during acceleration and deceleration, and in addition, detects the acceleration in the longitudinal direction depending on the angle of the slope because a gravitational direction at the time of traveling on a downhill or an uphill relatively inclines to the longitudinal direction in comparison with at the time of horizontal traveling.

Figure 6:
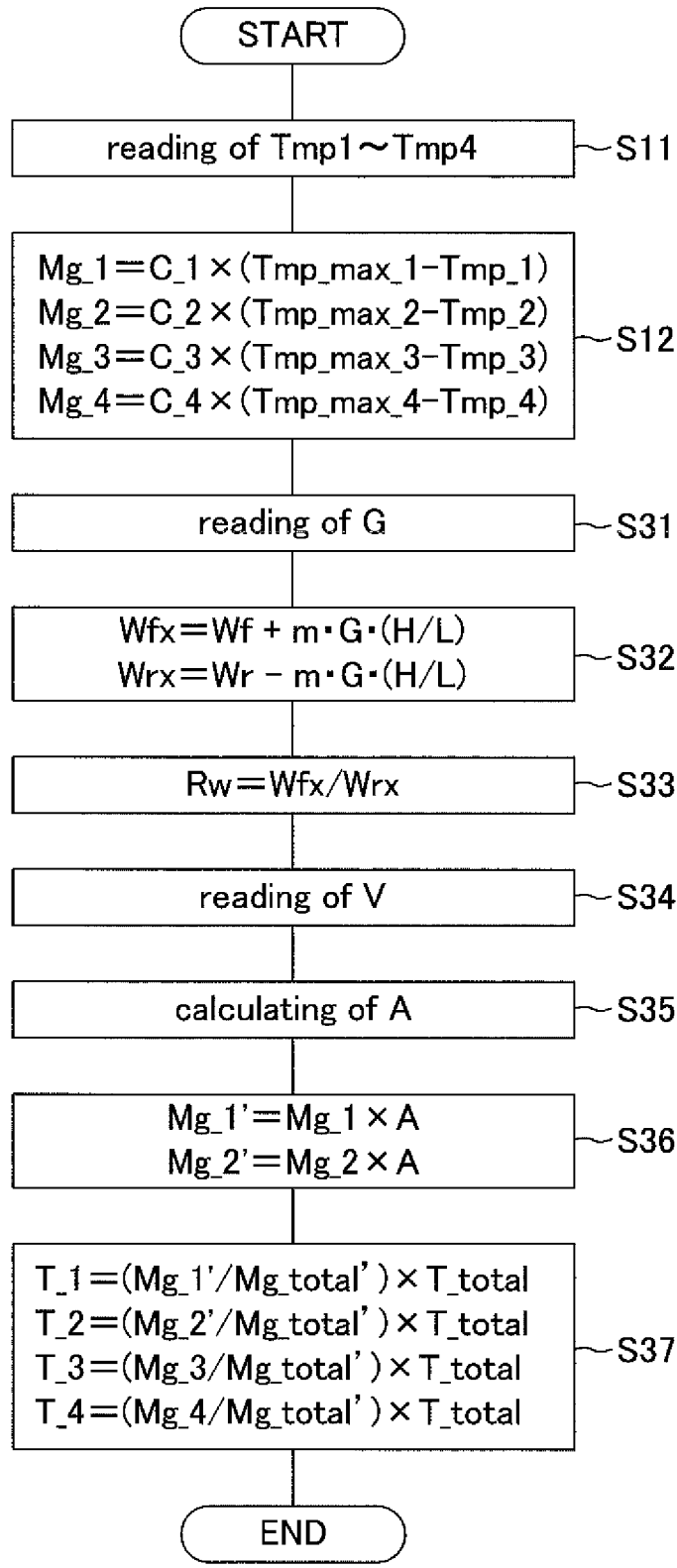
FIG. 6 is a braking/driving force distribution control routine concerning third embodiment.

FIG. 6 represents a braking/driving force distribution control routine performed by the ECU 40 as the third embodiment. In this the braking/driving force distribution control routine, the processing of step S13 of the first embodiment have been changed to steps S31-S37. Note that, about the processing being the same as the processing in the first embodiment, the common number is referred to drawings, and such processing should be briefly described.

When the braking/driving force distribution control routine starts, the ECU 40 reads motor temperatures Tmp_k (k=1-4) in step S11, and in step S12 subsequently calculates thermal margins Mg_1-Mg_4 of in-wheel motors 20_1-20_4 by using formulas (1)-(4) like as the case of the first embodiment. Then subsequently, in step S31, the ECU 40 reads the acceleration G in the longitudinal direction of the vehicle 1 detected by the acceleration sensor 45. Then subsequently, in step S32, the ECU 40 calculates the load Wfx acting on front wheels 10_1, 10_2 and the load Wrx acting on rear wheels 10_3, 10_4 based on the acceleration G by using formulas (17), (18) below.

$$Wfx = Wf + m \cdot G \cdot (H/L) \quad \text{formula (17)}$$

$$Wrx = Wr - m \cdot G \cdot (H/L) \quad \text{formula (18)}$$

Here, m is the vehicle mass [kg], Wf is the front wheel load [N] in the stationary state, Wr is the rear wheel load [N] in the stationary state, H is the heavy center height [m], L is the wheel base [m]. Second member of the right side of above formulas represents a load moving amount. Because the load moves to the front wheel side at the braking, the above formulas are applied at the time of the braking, but at the acceleration, the load moves to the rear wheel side because a direction of acceleration G becomes contrary to the case of the braking.

Then subsequently, the ECU 40 calculates a load ratio Rw (=Wfx/Wrx) which is the ratio of the front wheel load Wfx to the rear wheel load Wrx in step S33.

To the stability of the vehicle 1, the distribution ratio of the braking/driving force between the front wheel 10_1, the 10_2 side and the rear wheel 10_3, 10_4 side should be Wfx:Wrx. Thus, the stability of the vehicle 1 can be improved by considering the load balance in addition to the balance of the thermal margin, but, at the low-speed traveling, because the cooling performance of in-wheel motors 20 of all wheels 10 decreases (in a condition that cooling operation caused by the wind becomes hard to be provided), when the braking/driving force is adjusted by distribution depending on the load balance, a difference is easy to occur in the thermal margin of in-wheel motor 20. Accordingly, in the third embodiment, Not only the load balance is considered in addition to the balance of the thermal margin, but also, the adjustment degree of the distribution is changed depending on the vehicle speed V as follows.

Figure 7:
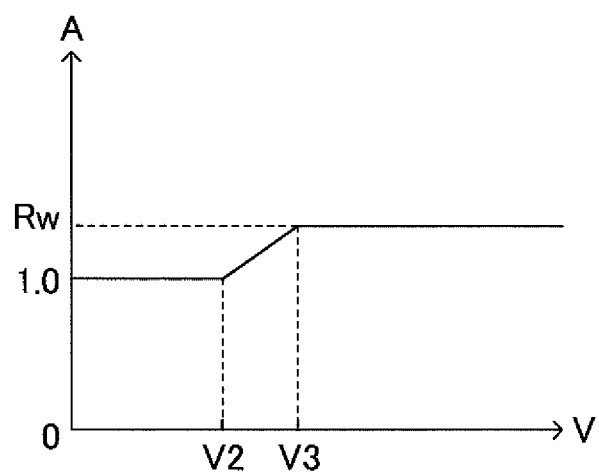
FIG. 7 is a graph representing a distribution adjustment coefficient map concerning third embodiment.

After having calculated the load ratio Rw (=Wfx/Wrx) in step S33, the ECU 40 reads the vehicle speed V detected by the vehicle speed sensor 43 in step S34 and, in step S35, calculates a distribution adjustment coefficient A. The ECU 40 stores a distribution adjustment coefficient map as shown in FIG. 7 and calculates the distribution adjustment coefficient A with reference to this distribution adjustment coefficient map.

The distribution adjustment coefficient map has the characteristic that the distribution adjustment coefficient A is set to 1.0 when the vehicle speed V is less than a reference vehicle speed V2, and the distribution adjustment coefficient A is set in the load ratio Rw when the vehicle speed V is more than a reference vehicle speed V3, and the distribution adjustment coefficient A is set to a coefficient which changes from 1.0 to the load ratio Rw with increase of the vehicle speed V linearly when the vehicle speed V is more than the reference vehicle speed V2 and is less than the reference vehicle speed V3. This reference vehicle speed V2 represents a border of the vehicle speed V which begins to become in condition that all in-wheel motors 20 is hard to cool off by the wind. Note that, in this FIG. 7, it is an example when the front wheel load Wfx is bigger than the rear wheel load Wrx, but because the load ratio Rw becomes the value smaller than 1.0 when the front wheel load Wfx is smaller than the rear wheel load Wrx, the distribution adjustment coefficient A has a characteristic to decrease to approach the load ratio Rw when the vehicle speed V becomes larger than the reference vehicle speed V2.

Then subsequently, in step S36, the ECU 40 calculates load ratio multiplication thermal margins Mg_1', Mg_2' multiplied by the distribution adjustment coefficient A in thermal margins Mg_1, Mg_2 by using formulas (19), (20).

$$Mg\_1' = Mg\_1 \times A \quad \text{formula (19)}$$

$$Mg\_2' = Mg\_2 \times A \quad \text{formula (20)}$$

Then subsequently, the ECU calculates requested torques T_1-T_4 for each wheel based on both of load ratio multiplication thermal margins Mg_1', Mg_2' calculated in step S36 and thermal margins Mg_3, Mg_4 calculated in step S12 by using formulas (21)-(24) below.

$$T\_1=(Mg\_1'/Mg\_total')\times T\_total \quad \text{formula (21)}$$

$$T\_2=(Mg\_2'/Mg\_total')\times T\_total \quad \text{formula (22)}$$

$$T\_3=(Mg\_3/Mg\_total')\times T\_total \quad \text{formula (23)}$$

$$T\_4=(Mg\_4/Mg\_total')\times T\_total \quad \text{formula (24)}$$

Here, Mg_total' is a total value (=Mg_1'+Mg_2'+Mg_3+Mg_4) with load ratio multiplication thermal margins Mg_1', Mg_2' and thermal margins Mg_3, Mg_4.

The ECU 40 terminates the braking/driving force distribution control routine after having calculated requested torques T_1-T_4 for each wheel in step S37. And, similar processing is repeated in a scheduled period. The ECU 40 controls the operation of the inverter 25 based on requested torques T_1-T_4 for each wheel calculated by this braking/driving force distribution control routine so that each in-wheel motor 20_1-20_4 generates requested torques T_1-T_4 for each wheel.

According to the braking/driving force distribution control routine as this third embodiment, in cases where the speed V is more than the reference vehicle speed V2 based on the vehicle speed V representing the traveling condition of the vehicle 1, the vehicle stability can be improved to distribute the braking/driving force between four wheels in consideration of the load balance as well as the thermal margin. Also, because the cooling performance of all in-wheel motors 20 decreases at low-speed traveling that the vehicle speed V is less than the reference vehicle speed V2, the braking/driving force is distributed between four wheels on the basis of the balance of the thermal margin (in this example, considering the load ratio between front wheels 10_1, 10_2 and rear wheels 10_3, 10_4 being 1:1 without considering the load balance), each in-wheel motor 20 can generate uniform amounts of heat, and it is possible to prevent that particular in-wheel motor 20 became being with an overheat state in an early stage.

Note that, the second embodiment may be put together in the third embodiment. For example, when the vehicle speed V is higher than the reference vehicle speed (e.g., a speed corresponding to the reference vehicle speed V1 in the second embodiment, for example) which is higher than the reference vehicle speed V3, it may adjust to increase the distribution of the braking/driving force to in-wheel motors 20_1, 20_2 of front wheels 10_1, 10_2, and to decrease the distribution of the braking/driving force to in-wheel motors 20_3, 20_4 of rear wheels 10_3, 10_4. Also, it is possible to find the load balance from the detection value detected by a load sensor provided for detecting the load to act on each wheel. Alternatively, t is possible to calculate the load balance from both the detection value detected by a vehicle height sensor provided for detecting the height of the vehicle and the spring constant of the suspension, or the preset fixed value may be used.

Figure 8:
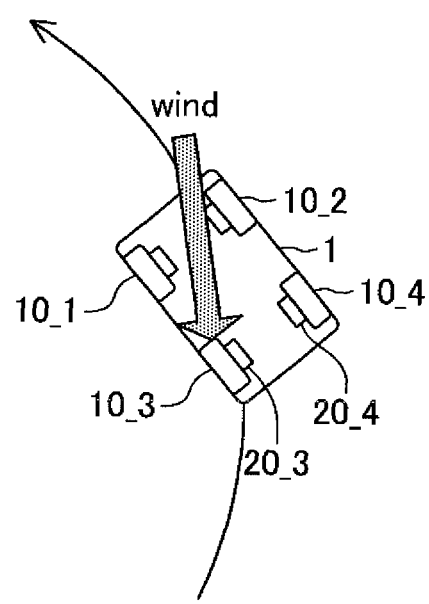
FIG. 8 is a figure describing imbalance of the cooling performance of the rear wheel concerning fourth embodiment.

Then, a fourth embodiment is described. During the turning traveling of the vehicle, because the inside of one of rear wheels 10_3, 10_4 is hard to come in contact with the wind, the in-wheel motor 20 of such wheel is hard to cool off. For example, during the left turning of the vehicle 1 at high speed as shown in FIG. 8, because the in-wheel motor 20_3 of the rear wheel 10_3 as an inside wheel hits the wind directly, its cooling performance should improve, but because the in-wheel motor 20_4 of the rear wheel 10_4 as an outside wheel is hard to hit the wind, its cooling performance should decrease. Thus, in the fourth embodiment, the distribution of the braking/driving force generated at in-wheel motors 20_3, 20_4 of rear wheels 10_3, 10_4, is adjusted depending on the turning condition of the vehicle 1.

Figure 9:
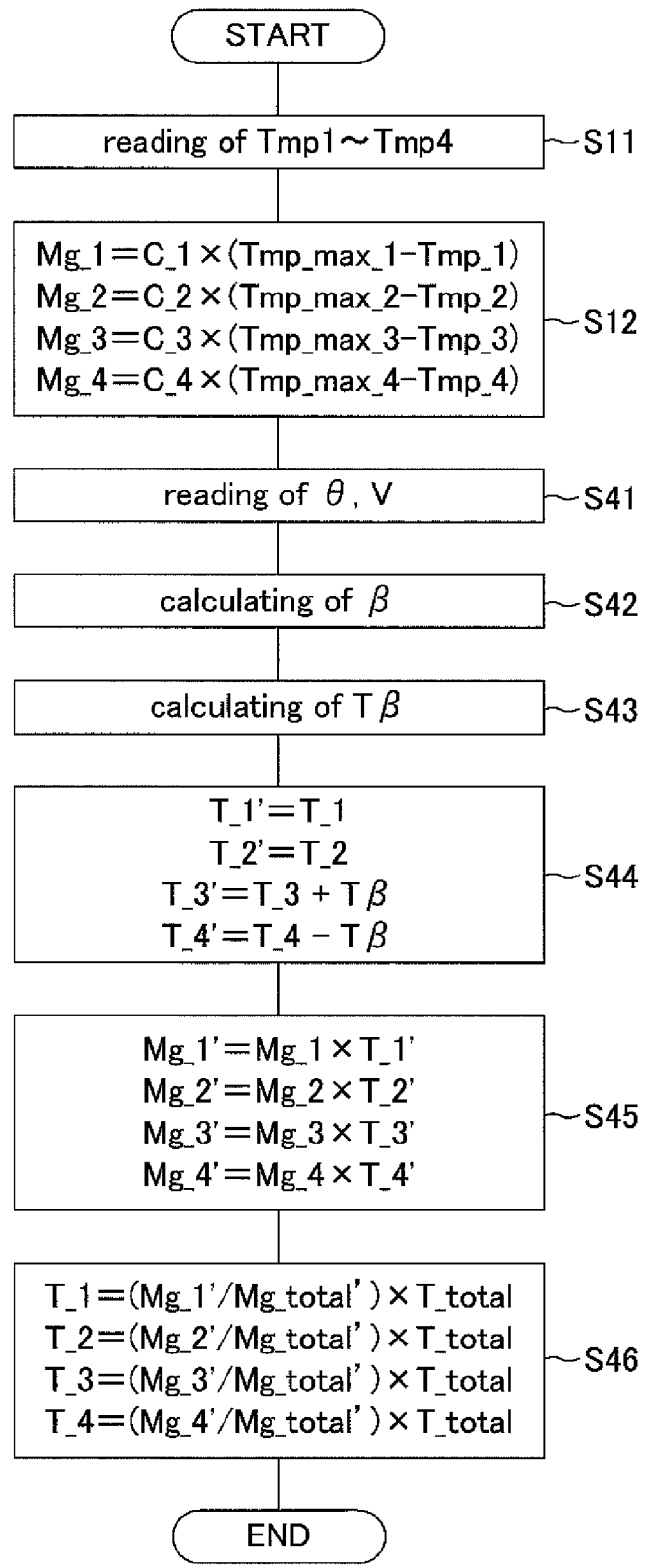
FIG. 9 is a braking/driving force distribution control routine concerning fourth embodiment.

FIG. 9 represents a braking/driving force distribution control routine performed by the ECU 40 as the fourth embodiment. In this the braking/driving force distribution control routine, the processing of step S13 of the first embodiment have been changed to steps S41-S46. Note that, about the processing being the same as the processing in the first embodiment, the common number is referred to drawings, and such processing should be briefly described.

Figure 10:
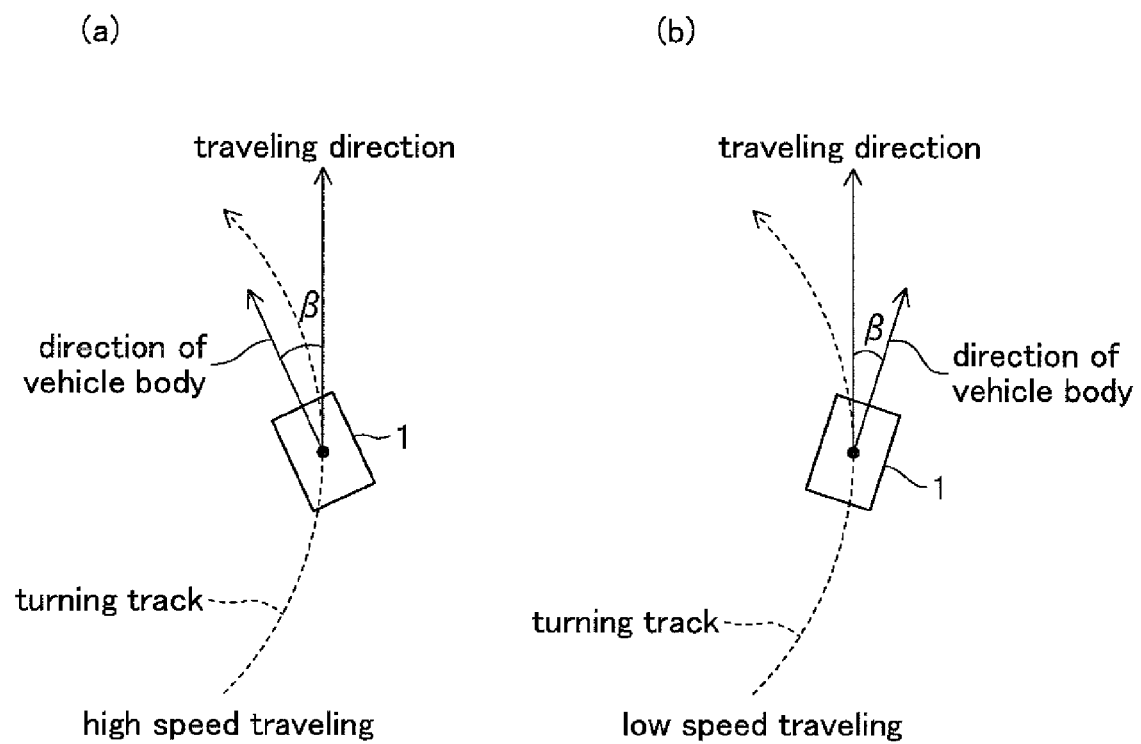
FIG. 10 is a figure describing a slip angle concerning fourth embodiment.

When the braking/driving force distribution control routine starts, the ECU 40 reads motor temperatures Tmp_k (k=1-4) in step S11, and in step S12 subsequently calculates thermal margins Mg_1-Mg_4 of in-wheel motors 20_1-20_4 by using formulas (1)-(4) like as the case of the first embodiment. Then subsequently, in step S41, the ECU 40 reads the steering angle θ detected by steering angle sensor 44 and the vehicle speed V detected by the vehicle speed sensor 43, and calculates a slip angle β based on the steering angle θ and the vehicle speed V in step S42. The slip angle β represents the direction of the body facing each other in the traveling direction of the vehicle 1. The slip angle β is minus number (negative number) when the body faces the turning direction inside as shown in FIG. 10 (*a*) to the traveling direction of the vehicle, and the slip angle β is plus number (positive number) when the body faces the turning direction outside as shown in FIG. 9 (*b*) to the traveling direction of the vehicle. Generally the slip angle β is known to be able to be calculated by the next formula (25).

[1]

$$\beta = \left( \frac{1 - \frac{m}{2L} \cdot \frac{L_f}{L_r \cdot K_r} \cdot V^2}{1 - \frac{m}{2L^2} \cdot \frac{L_f \cdot K_f - L_r \cdot K_r}{K_f \cdot K_r} \cdot V^2} \right) \frac{L_r}{L} \cdot \delta \quad (25)$$

Figure 11:
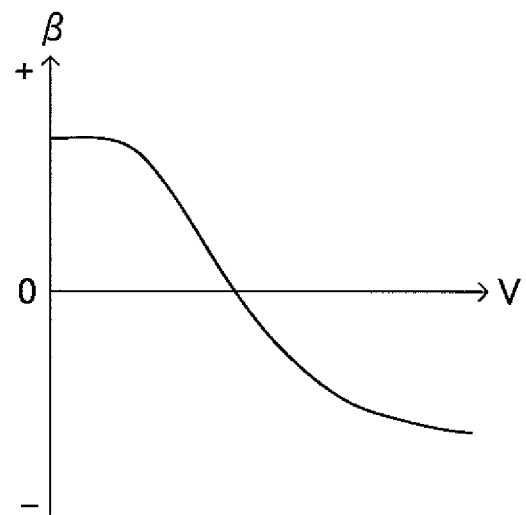
FIG. 11 is a graph representing relations between the slip angle and the vehicle speed concerning fourth embodiment.

Here, m is the vehicle mass [kg], L is the wheel base [m], Lf is the distance from the center of gravity to the front wheel shaft, Kf is the cornering power of the front wheel, Kr is the cornering power of the rear wheel, V is the vehicle speed, δ is the rudder angle. The rudder angle δ is found from the steering angle θ (the rotation angle of the handle) detected by the steering angle sensor 44. For example, the rudder angle δ is expressed as a positive number when the rudder angle is an angle of the right steerage direction to the neutral position, and is expressed as a negative number when the rudder angle is an angle of the left steerage direction to the neutral position. Also, as shown in FIG. 11, the code of the slip angle β changes between at a high-speed traveling in which the vehicle speed V is bigger with at a low-speed traveling in which the vehicle speed V is smaller.

Then subsequently, in step S43 the ECU 40 calculates a correction torque Tβ based on the slip angle β with reference to a correction torque map shown in FIG. 12. The correction torque map is stored by memory in the ECU 40 and has characteristics to make the correction torque Tβ be proportional to the slip angle β in the range that an absolute value of the slip angle β is less than the set value, and to limit the correction torque Tβ to the constant value of the code same as the slip angle β.

Then subsequently, the ECU 40 corrects the requested torque for each wheel by using the correction torque Tβ in step S44. In this embodiment, requested torques T_3-T_4 for the rear wheels are corrected by using the correction torque Tβ. When a corrected value of requested torques T_1-T_4 for each wheel is assumed a requested torques T_1', T_2', T_3', T_4' for each wheel after correction, the requested torques T_1', T_2', T_3', T_4' for each wheel after correction are calculated by using formulas (26), (27), (28), (29) below.

$$T\_1'=T\_1 \qquad \text{formula (26)}$$

$$T\_2'=T\_2 \qquad \text{formula (27)}$$

$$T\_3'=T\_3+T\beta \qquad \text{formula (28)}$$

$$T\_4'=T\_4-T\beta \qquad \text{formula (29)}$$

In this case, because a code of the slip angle β changes depending on the vehicle speed V, the correction torque Tβ is set so that the requested torque of an inner side wheel 10 increases and the requested torque of an outer side wheel 10 decreases at the high-speed traveling, and the requested torque of an outer side wheel 10 increases and the requested torque of an inner side wheel 10 decreases at the low-speed traveling.

Note that, requested torques T_1, T_2, T_3, T_4 for each wheel before correction may be a torque that the total requested torque T_total was distributed into equally, or for example, it may be a torque calculated using the right and left wheel distribution ratio depending on the steering angle θ detected by the steering angle sensor 44 and the vehicle speed V, or, it may be a torque distributed using the front and rear wheel load ratio described in third embodiment.

Then subsequently, the ECU calculates torque multiplication thermal margins Mg_1'-Mg_4' multiplied by requested torques T_1'-T_4' for each wheel after correction in thermal margins Mg_1-Mg_4 by using formulas (30), (31), (32), (33) below in step S45.

$$Mg\_1'=Mg\_1 \times T\_1' \qquad \text{formula (30)}$$

$$Mg\_2'=Mg\_2 \times T\_2' \qquad \text{formula (31)}$$

$$Mg\_3'=Mg\_3 \times T\_3' \qquad \text{formula (32)}$$

$$Mg\_4'=Mg\_4 \times T\_4' \qquad \text{formula (33)}$$

The processing of this step S45 corrects the balance of the thermal margin with the balance of requested torques T_1'-T_4' for each wheel after correction.

Then subsequently, in step S46 the ECU calculates final requested torques T_1-T_4 for each wheel by formulas (34)-(37) below by using torque multiplication thermal margins Mg_1'-Mg_4' calculated in step S45.

$$T\_1=(Mg\_1'/Mg\_total') \times T\_total \qquad \text{formula (34)}$$

$$T\_2=(Mg\_2'/Mg\_total') \times T\_total \qquad \text{formula (35)}$$

$$T\_3=(Mg\_3'/Mg\_total') \times T\_total \qquad \text{formula (36)}$$

$$T\_4=(Mg\_4'/Mg\_total') \times T\_total \qquad \text{formula (37)}$$

Here, Mg_total' is a total value (=Mg_1'+Mg_2'+Mg_3'+Mg_4') of torque multiplication thermal margins Mg_1'-Mg_4' of each in-wheel motors 20_1-20_4.

The ECU 40 terminates the braking/driving force distribution control routine after having calculated requested torques T_1-T_4 for each wheel in step S46. And, similar processing is repeated in a scheduled period. The ECU 40 controls the operation of the inverter 25 based on requested torques T_1-T_4 for each wheel calculated by this braking/driving force distribution control routine so that each in-wheel motor 20_1-20_4 generates requested torques T_1-T_4 for each wheel.

According to the braking/driving force distribution control routine as this fourth embodiment, based on the slip angle β representing the traveling condition of the vehicle, the requested torque for each wheel is adjusted to decrease about the rear wheel to which the wind is hard to hit at the time of turning traveling, and the requested torque for each wheel is adjusted to increase about the rear wheel to which the wind is easy to hit. Therefore, it is possible to distribute the total requested torque T_total between in-wheel motors 20_1-20_4 with the balance of the cooling performance being added to the balance of the thermal margin of the in-wheel motor 20. As a result, each in-wheel motor 20 can generate uniform amounts of heat, and it is possible to prevent that particular in-wheel motor 20 became being with an overheat state in an early stage.

Figure 12:
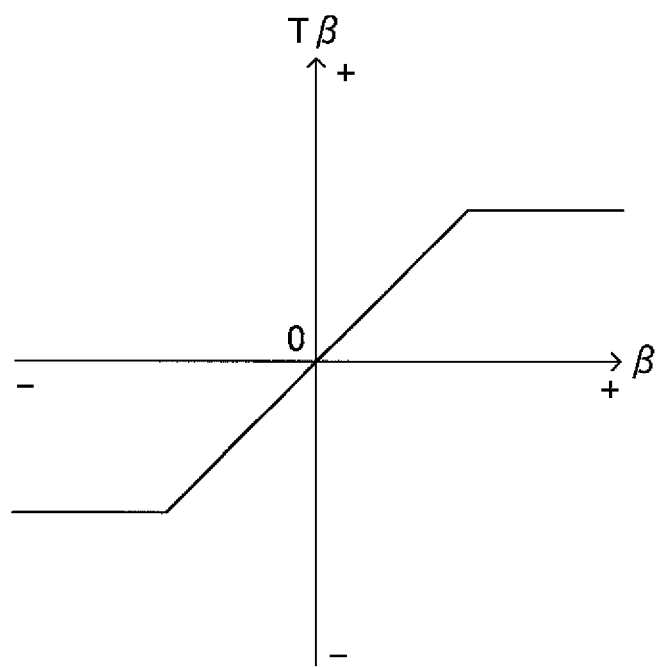
FIG. 12 is a graph representing a correction torque map concerning fourth embodiment.

Note that, in this fourth embodiment, the correction torque Tβ is calculated based on the slip angle β, but a correction thermal margin Mg_β may be calculated based on the slip angle β (the map in which the vertical axis of the correction torque map of FIG. 12 corresponds to the correction thermal margin Mg_β should be use), and the thermal margin Mg_3 and the thermal margin Mg_4 may be corrected by using such correction thermal margin Mg_β. In this case, the correction thermal margin Mg_β should be added to the thermal margin of the in-wheel motor 20 to which the wind is easy to hit, and the correction thermal margin Mg_β should be subtracted from the thermal margin of the in-wheel motor 20 to which the wind is hard to hit.

Also, the processing of the second embodiment may be put together in the fourth embodiment. In this case, correction factors α_front, α_rear should be calculated depending on the vehicle speed V like as the second embodiment, and thermal margins Mg_1-Mg_4 (cf. step S23) calculated by using such correction factors α_front, α_rear should be use as thermal margins Mg_1'-Mg_4' in step S45.

Also, the processing of the third embodiment may be put together in the fourth embodiment. In this case, the distribution adjustment coefficient A should be calculated like as the third embodiment (cf. step S35), and this distribution adjustment coefficient A should be multiplied by the right side of formulas (30), (31) of step S45. Also, in similar fashion, the processing of the second embodiment and the processing of the third embodiment may be put together in the fourth embodiment.

The braking/driving force control device of the present embodiment is described as mentioned above, but the present invention is not limited to embodiments above, and various kinds of changes are possible without departing from the object of the invention.

For example, it may be provided with a distribution adjustment means which acquires information (road information, vehicle location information) holding by the navigation device 46 and predicts the change of the traveling condition of vehicle 1 beforehand, and adjusts the distribution of the braking/driving force based on the heat dissipation performance of each in-wheel motor 20 responded to the predicted traveling condition. For example, when it is predicted that the vehicle 1 will travel on a spiral road, the distribution of the in-wheel motor 20 to which the wind is hard to hit at the time of turning traveling may be reduced and the distribution of the in-wheel motor 20 to which the wind is easy to hit may be increase from a stage before entering the spiral road like as the fourth embodiment. In this case, the slip angle should be estimated based on the predicted vehicle speed and the rotation radius of the road provided from the road information, and the braking/driving force should be adjusted.

Also, when it is predicted that the vehicle 1 will travel on an uphill slope or a downhill slope, the load ratio between front wheels and rear wheels may be estimated based on the slant of the road included in the road information from a stage before entering the slope, and the distribution of the braking/driving force should be adjusted by using the estimated load ratio like as the third embodiment.

It is possible to average the thermal margin of the each in-wheel motor 20 more suitably by predicting the traveling condition of the vehicle 1 beforehand in this way, and by adjusting the distribution of the braking/driving force based on the heat dissipation performance of the each in-wheel motor 20 depending on the predicted traveling condition.

Also, the yaw rate sensor or the lateral acceleration sensor may be used as means to detect the traveling condition of the vehicle.

The invention claimed is:

1. A vehicle braking/driving force control device, comprising:
   a plurality of in-wheel motors, each of the plurality of in-wheel motors being provided with a corresponding one of a plurality of wheels of a vehicle, each of the plurality of in-wheel motors generating a driving force or a braking force for the corresponding wheel,
   an electronic control unit configured to independently control each of the plurality of in-wheel motors to produce the driving force or the braking force in each of the corresponding wheels,
   wherein the electronic control unit is configured to
   calculate a size of a thermal margin of each of the plurality of in-wheel motors, and
   calculate a distribution of the driving force or the braking force to be produced in each of the plurality of wheels by each of the plurality of in-wheel motors to reduce differences between the thermal margins of each of the plurality of in-wheel motors based on the calculated sizes of the thermal margins of each of the plurality of in-wheel motors.

2. The vehicle braking/driving force control device according to claim 1,
   wherein the electronic control unit acquires a temperature of each of the plurality of in-wheel motors, and calculates the size of the thermal margin of each of the plurality of in-wheel motors based on the acquired temperature of each of the plurality of in-wheel motors and a thermal capacity of each of the plurality of in-wheel motors.

3. The vehicle braking/driving force control device according to claim 2,
   wherein the electronic control unit calculates the size of the thermal margin of each of the plurality of in-wheel motors based on a product of the thermal capacity of each of the plurality of in-wheel motors and a difference between the acquired temperature of each of the plurality of in-wheel motors and an allowable limit temperature of each of the plurality of in-wheel motors.

4. The vehicle braking/driving force control device according to claim 1,
   wherein the electronic control unit calculates the distribution of the driving force or the braking force so that a total requested braking/driving force, which is a requested value of the driving force or the braking force to be produced in the plurality of the in-wheel motors of all of the wheels of the vehicle, is distributed into the corresponding in-wheel motor of each of the plurality of wheels to reduce an imbalance of the thermal margins between the plurality of the in-wheel motors of each of the wheels.

5. The vehicle braking/driving force control device according to claim 1,
   wherein the electronic control unit calculates the distribution of the driving force or the braking force so that a left wheel requested braking/driving force, which is a requested value of the driving force or the braking force to be produced in the in-wheel motors of a left side front wheel and a left side rear wheel, is distributed between the in-wheel motors of the left side front wheel and the left side rear wheel to reduce a difference between the thermal margin of the in-wheel motor of the left side front wheel and the thermal margin of the in-wheel motor of the left side rear wheel, and a right wheel requested braking/driving force, which is a requested value of the driving force or the braking force to be produced in the in-wheel motors of a right side front wheel and a right side rear wheel, is distributed between the in-wheel motors of the right side front wheel and right side rear wheel to reduce a difference between the thermal margin of the in-wheel motor of the right side front wheel and the thermal margin of the in-wheel motor of the right side rear wheel.

6. The vehicle braking/driving force control device according to claim 1,
   wherein the electronic control unit:
   acquires a traveling condition of the vehicle, and
   adjusts the distribution of the driving force or the braking force based on a heat dissipation performance of the each of the plurality of in-wheel motors in response to the acquired traveling condition of the vehicle.

7. The vehicle braking/driving force control device according to claim 6,
   wherein the electronic control unit adjusts the distribution of the driving force or the braking force so that the driving force or the braking force is reduced for in-wheel motors of the plurality of in-wheel motors as the in-wheel motors have more difficulty dissipating heat based on the heat dissipation performance of each of the plurality of in-wheel motors in response to the acquired traveling condition of the vehicle.

8. The vehicle braking/driving force control device according to claim 7,
   wherein the traveling condition acquired by the electronic control unit is a vehicle speed of the vehicle, and
   the electronic control unit adjusts the distribution of the driving force or the braking force so that when the acquired vehicle speed is relatively high, a distribution ratio of the driving force or the braking force of the in-wheel motors of the rear wheels relative to the driving force or the braking force of the in-wheel motors of the front wheels becomes small in comparison with a case of a relatively low speed condition of the vehicle.

9. The vehicle braking/driving force control device according to claim 8,
   wherein the traveling condition acquired by the electronic control unit includes a turning condition of the vehicle, and
   the electronic control unit adjusts the distribution of the driving force or the braking force so that the driving force or the braking force is reduced for in-wheel motors of the plurality of in-wheel motors as the in-wheel motors have more difficulty dissipating heat among the in-wheel motors of the left side rear wheel and the right side rear wheel based on the acquired turning condition of the vehicle.

10. The vehicle braking/driving force control device according to claim 9,
wherein the turning condition acquired by the electronic control unit includes a slip angle of the vehicle, and
the electronic control unit adjusts the distribution of the driving force or the braking force so that the driving force or the braking force is reduced for in-wheel motors of the plurality of in-wheel motors as the in-wheel motors have more difficulty dissipating heat among the in-wheel motors of the left side rear wheel and the right side rear wheel based on the acquired slip angle of the vehicle.

11. The vehicle braking/driving force control device according to claim 6,
wherein the traveling condition acquired by the electronic control unit is a vehicle speed of the vehicle, and
the electronic control unit acquires a load balance representing a balance between the load to be added to the front wheel of the vehicle and the load to be added to the rear wheel of the vehicle, and adjusts the driving force or the braking force of each of the plurality of in-wheel motors depending on the acquired load balance, and lowers a degree of adjusting the distribution depending on the load balance when the vehicle speed is relatively low in comparison with a case when the vehicle speed is relatively high.

* * * * *